(12) United States Patent
Zhou (10) Patent No.: US 8,301,652 B2
(45) Date of Patent: Oct. 30, 2012

(54) PARALLEL ALGORITHM TO IMPLEMENT TEMPORAL AGGREGATE QUERIES

(75) Inventor: Xin Zhou, Monterey Park, CA (US)

(73) Assignee: Teradata US, Inc., Dayton, OH (US)

( * ) Notice: Subject to any disclaimer, the term of this patent is extended or adjusted under 35 U.S.C. 154(b) by 716 days.

(21) Appl. No.: 12/203,180

(22) Filed: Sep. 3, 2008

(65) Prior Publication Data

US 2010/0057706 A1  Mar. 4, 2010

(51) Int. Cl.
*G06F 17/30* (2006.01)
(52) U.S. Cl. ........................................... 707/769
(58) Field of Classification Search .................... 707/725
See application file for complete search history.

(56) References Cited

U.S. PATENT DOCUMENTS

| | | | | |
|---|---|---|---|---|
| 5,440,730 | A * | 8/1995 | Elmasri et al. | 1/1 |
| 6,324,535 | B1 * | 11/2001 | Bair et al. | 707/769 |
| 2007/0148625 | A1 * | 6/2007 | Biltz et al. | 434/262 |

OTHER PUBLICATIONS

Moon, Efficient Algorithms for Large Scale Temporal Aggregation, IEEE Transactions on Knowledge and Data Engineering, vol. 15 No. 3 May/Jun. 2003.*
Kline, Computing Temporal Aggregates, IEEE, 1995.*

* cited by examiner

*Primary Examiner* — Neveen Abel Jalil
*Assistant Examiner* — Kevin L Young
(74) *Attorney, Agent, or Firm* — Randy Campbell (57) ABSTRACT

A method executed by a plurality of processors in a database system to implement temporal aggregate queries. The database system has a temporal table. A plurality of consecutive temporal partitions are defined and allocated to the respective processors. A query is received to aggregate at least one attribute of the temporal table. In response to the query, a plurality of timestamps are identified in the temporal table, the respective timestamps are allocated to the respective temporal partitions, the value changes in the at least one attribute at the plural timestamps are computed within each partition using the respective processors to which each partition is allocated, and the value changes within each partition are aggregated using the respective processors to which each partition is allocated to produce an aggregate value for the query.

16 Claims, 4 Drawing Sheets

PARALLEL ALGORITHM TO IMPLEMENT TEMPORAL AGGREGATE QUERIES

BACKGROUND

A database is a collection of logically related data arranged in a predetermined format, such as in tables that contain rows and columns. To access the content of a table in the database, queries according to a standard database query language (such as the Structured Query Language or SQL) are submitted to the database. A query can be issued to insert new entries into a table of a database (such as to insert a row into the table), modify the content of the table, or to delete entries from the table. Examples of SQL statements include INSERT, SELECT, UPDATE, and DELETE.

Certain tables contain temporal data, where rows (or tuples) of the table contain timestamp information to indicate a time associated with each row. In one example, a new row can be inserted into a temporal table whenever some information associated with a particular record changes. Each new row inserted into the table is associated with a timestamp to indicate the time of change, for example.

One type of query that can be performed with respect to tables in a database is an aggregate query, which performs aggregation (e.g., sum, average, etc.) of attribute values in the table. However, if the table is a temporal table containing rows associated with timestamps, then performing a simple aggregation on attribute values may not produce accurate results. Conventionally, when performing aggregation on a temporal table, relatively complex nested queries are submitted to perform aggregation properly. Such nested queries are complex and prone to error.

SUMMARY

Described below is a method executed by a plurality of processors in a database system. The database system has a temporal table. A plurality of consecutive temporal partitions are defined and allocated to the respective processors.

A query is received to aggregate at least one attribute of the temporal table. In response to the query, a plurality of timestamps are identified in the temporal table, the respective timestamps are allocated to the respective temporal partitions, the value changes in the at least one attribute at the plural timestamps are computed within each partition using the respective processors to which each partition is allocated, and the value changes within each partition are aggregated using the respective processors to which each partition is allocated to produce an aggregate value for the query.

Also described below is an article comprising at least one computer-readable storage medium containing instructions that when executed cause at least one processor in a database system to perform the above method.

Further described below is a database system. The database system includes a storage subsystem to store a temporal base table having a plurality of tuples each containing timestamp information, and at least one processor.

The processor is configured to define a plurality of consecutive temporal partitions, allocate the temporal partitions to the respective processors, and receive a query to aggregate at least one attribute of the temporal table.

In response to the query the processor is configured to identify a plurality of timestamps in the temporal table, allocate the respective timestamps to the respective temporal partitions, compute value changes in the at least one attribute at the plural timestamps within each partition using the respective processors to which each partition is allocated, and aggregate the value changes within each partition using the respective processors to which each partition is allocated to produce an aggregate value for the query.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
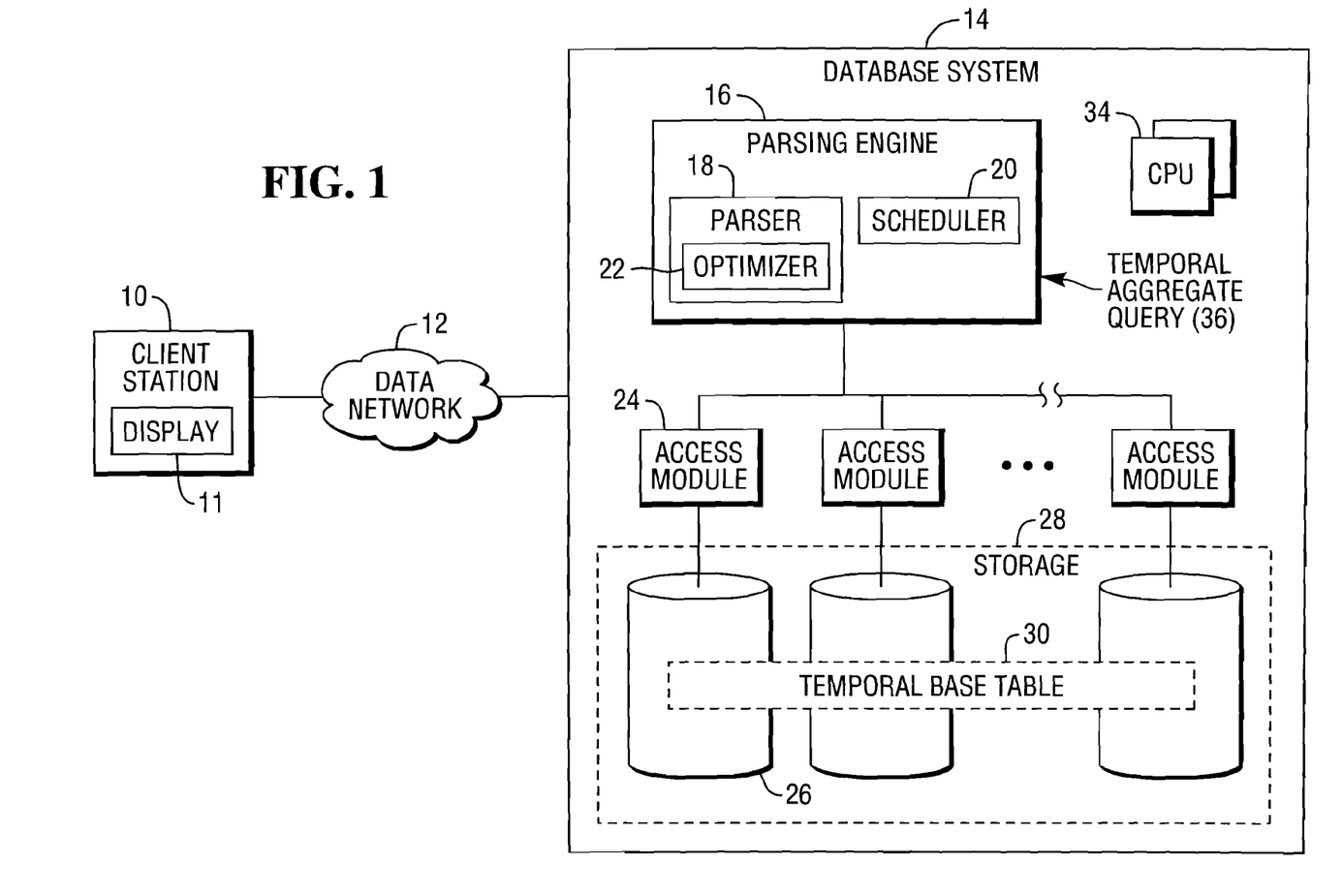
FIG. 1 is a block diagram of an example arrangement that includes a database system according to an embodiment.

FIG. 1 illustrates an example arrangement in which a client station (or plural client stations) 10 is (are) coupled to a database system 14 over a data network 12. Examples of the data network 12 include a local area network (LAN), a wide area network (WAN), the Internet, and so forth. The client station 10 is capable of issuing queries according to a standard database query language to the database system 14 to access or update data or to create or alter data structures (e.g., tables, rows, and so forth). One example of a standard database query language is the Structured Query Language (SQL), as promulgated by the American National Standards Institute (ANSI).

The database system 14 includes a storage subsystem 28 that stores various data, including relational tables. Each relational table contains rows and columns. The storage subsystem 28 includes plural storage modules 26, which can be physical storage devices or logical representations of partitions of the storage subsystem 28.

The database system 14 also includes a parsing engine 16, which has a parser 18 and a scheduler 20. The parser 18 receives database queries (such as those submitted by the client system 10), parses the received query, and generates executable steps. The parser 18 includes an optimizer 22 that generates query plans, selecting the most efficient from among the plural query plans. The scheduler 20 sends the executable steps generated by the parser 18 to multiple access modules 24 in the database system.

Each access module 24 performs the following tasks: inserts, deletes, or modifies contents of tables; creates, modifies, or deletes definitions of tables; retrieves information from definitions and tables; and locks databases and tables. In one example, each access module 24 is based on an access module processor (AMP) used in some TERADATA® database systems from Teradata Corporation (formerly a division of NCR Corporation). Each access module 24 manages access of data in respective storage modules 26. The presence of multiple access modules 24 and corresponding storage modules 26 define a parallel database system. In alternative embodiments, instead of database systems having multiple access modules, a database system with only one access module can be employed.

The access modules 24 and parsing engine 16 are part of the database software executable in the database system 14. The database software is executable on one or more central processing units (CPUs) 34 of the database system 14. In the example of FIG. 1, the components of the database system 14 are depicted as being part of one node. Note that the database system 14 can actually be implemented in a multi-node system where each node contains one or more access modules 24 and parsing engines 16 to provide a distributed database architecture.

As further depicted in FIG. 1, a temporal base table 30 can be stored in the storage subsystem 28. The temporal base table 30 can be distributed across multiple storage modules 26, where different portions of the temporal base table 30 are stored in different storage modules 26.

A temporal base table 30 refers to a table that has rows (or tuples) containing timestamp information. The timestamp information indicates a time associated with the record represented by the tuple. The timestamp can indicate a time at which some event occurred, such as a change event (some attribute of a record has changed), and so forth. Alternatively, the timestamp information can indicate a time window or period during which the corresponding data in the row is applicable or valid. To specify the time window or period, the timestamp information can include a starting timestamp and an ending timestamp.

As depicted in FIG. 1, a query that can be received by the parsing engine 16 of the database system 14 is a temporal aggregate query 36 to perform temporal aggregation of at least one attribute of the temporal base table 30. "Temporal aggregation" of an attribute refers to computing an aggregate (e.g., sum, average, minimum, maximum, median, etc.) of values of the attribute contained in rows that have a time dimension (specified by the timestamp information). Since the rows have a time dimension, there may be multiple rows, for a given entity, that assign different values at different times to the attribute that is being aggregated. To produce an accurate result, performing aggregation in this context should take into account the assignment of different values at different times.

In some embodiments, the temporal aggregate query can be processed in linear time corresponding to the size of the base table 30. A further benefit provided by some embodiments is that simple Structured Query Language (SQL) queries can be used to perform the temporal aggregation. For example, the SQL queries can be SQL on-line analytic processing (OLAP) queries, such as those defined by SQL99, which is an ANSI (American National Standards Institute) standard. In other implementations, other types of SQL queries can be used to perform the temporal aggregation. An example SQL OLAP query includes a query that specifies an aggregate function (e.g., a moving window aggregate function).

A temporal aggregate query differs from traditional aggregate queries, in that temporal aggregate queries have to take the time dimension into consideration when performing aggregation on one or more attributes. One example is discussed in the context of an example base table, named EMPLOYEE_HISTORY, which contains temporal records.

| EMPNO | SALARY | TITLE | TSTART | TEND |
|---|---|---|---|---|
| 1001 | $ 60,000 | Software engineer | Jan. 01, 2007 | Dec. 31, 2007 |
| 1002 | $ 62,500 | Software engineer | Jan. 01, 2007 | Feb. 28, 2008 |
| 0801 | $ 80,000 | Sr. Software engineer | Jan. 01, 2007 | Mar. 31, 2008 |
| 0501 | $100,000 | Manager | Jan. 01, 2007 | Apr. 30, 2008 |

-continued

| EMPNO | SALARY | TITLE | TSTART | TEND |
|---|---|---|---|---|
| 1001 | $ 62,500 | Software engineer | Jan. 01, 2008 | Now |
| 1002 | $ 72,500 | Software engineer | Mar. 01, 2008 | Now |
| 0801 | $ 90,000 | Sr. Software engineer | Apr. 01, 2008 | Now |
| 0501 | $110,000 | Manager | May 01, 2008 | Now |

The attributes (columns) of the EMPLOYEE_HISTORY table include employee number (EMPNO), salary (SALARY), title (TITLE), a starting timestamp (TSTART), and an ending timestamp (TEND). In the example above, two tuples (or rows) are present for each employee. For example, the first row and the fifth row are for the employee having EMPNO 1001, the second and sixth rows are rows for EMPNO 1002, and so forth. The difference between the rows for the same employee is that the two different rows contain different timestamp information. Thus, the first row for EMPNO 1001 has a starting timestamp of 01-01-2007, and ending timestamp of 12-31-2007. In the example above, during this time period (from the starting timestamp to the ending timestamp), the employee had a salary of $60,000. Later, in a subsequent time period, 01-01-2008 and continuing to the present, the same employee (EMPNO 1001) has an increased salary of $62,500 (as indicated by the fifth row in the example EMPLOYEE_HISTORY table above).

Similar timestamp information and associated different salary values for other employees are listed in the example EMPLOYEE_HISTORY table above.

Suppose an organization is interested in a query (Q1) that seeks the total salary paid for all employees in the organization in 2005 and 2006 (combined). A traditional aggregate query such as:

SELECT SUM(SALARY) FROM EMPLOYEE_HISTORY;

would simply sum all of the SALARY values in the rows of the above example table (in other words, a sum of SALARY in all eight rows of the example table). This sum will return $637,500, which would be the wrong answer, since the total salary paid to all employees in 2005 and 2006 combined would be much less then $637,500. The correct response to the query is summarized in the summary table below:

| SALARY SUM | TSTART | TEND |
|---|---|---|
| $302,500 | Jan. 01, 2007 | Dec. 31, 2007 |
| $305,000 (=$302,500 + $2,500) | Jan. 01, 2008 | Feb. 28, 2008 |
| $315,000 (=$305,000 + $10,000) | Mar. 01, 2008 | Mar. 31, 2008 |
| $325,000 (=$315,000 + $10,000) | Apr. 01, 2008 | Apr. 30, 2008 |
| $335,000 (=$325,000 + $10,000 | May 01, 2008 | Now |

In the example summary table above, SALARY_SUM represents the aggregate that is being sought by the example query Q1. In the time period starting at 01-01-2007 and ending at 12-31-2007, SALARY_SUM is $302,500. This represents the combined annual salary of all four employees (1001, 1002, 0801, 0501) in the period between 01-01-2007 and 12-31-2007. Starting at 01-01-2008, however, employee 1001 received a raise from $60,000 to $62,500 (which represents a raise of $2,500). Thus, in the second row of the summary table above, SALARY_SUM becomes $305,000 (=$302,500+$2,500), which takes into account the change in salary in the time period between 01-01-2008 and 02-28-

2008. Starting on 03-01-2008, employee 1002 received a raise from $62,500 to $72,500 (a raise of $10,000). Thus, in the third row of the summary table above, SALARY_SUM becomes $315,000 (=$305,000+$10,000), which takes into account the change in salary in the period between 03-01-2008 and 03-31-2008. Starting on 04-01-2008, employee 0801 received a raise from $80,000 to $90,000 (a raise of $10,000). Thus, SALARY_SUM in the fourth row of the summary table is increased to $325,000, which takes into account the change in salary in the period between 04-01-2008 and 04-30-2008. Finally, on 05-01-2008, employee 0501 received a raise of $10,000, which causes SALARY_SUM in the fifth row of the summary table to be increased to $335,000.

In accordance with some embodiments, a temporal aggregate SQL query can be used to efficiently perform temporal aggregation. The temporal aggregate query is relatively simple and can use existing SQL queries, such as SQL OLAP queries. Generally, the temporal aggregate query is processed by identifying plural timestamps in a temporal table, and computing value changes of the attribute that is to be aggregated at the plural timestamps. The value changes are then aggregated to produce an aggregate value that represents the result for the query.

The above general tasks for performing the temporal aggregation are described in the context of an example given in FIGS. 2(a)-2(d). Four tuples 102, 104, 106, and 108 are graphically represented in FIG. 2(a). Tuple 102 contains the SALARY attribute value (100K) for employee 2. The timestamp information associated with tuple 102 includes beginning timestamp t2 and ending timestamp t3. The second tuple 104 contains the SALARY attribute value (80K) for employee 1, with starting timestamp t1 and ending timestamp t3. Tuple 106 contains the SALARY attribute value (70K) for employee 2 for the time period starting at timestamp t0 and ending at timestamp t2. Tuple 108 contains the SALARY attribute value (60K) for employee 1 in the time period starting at timestamp t0 and ending at timestamp t1.

Figure 2:
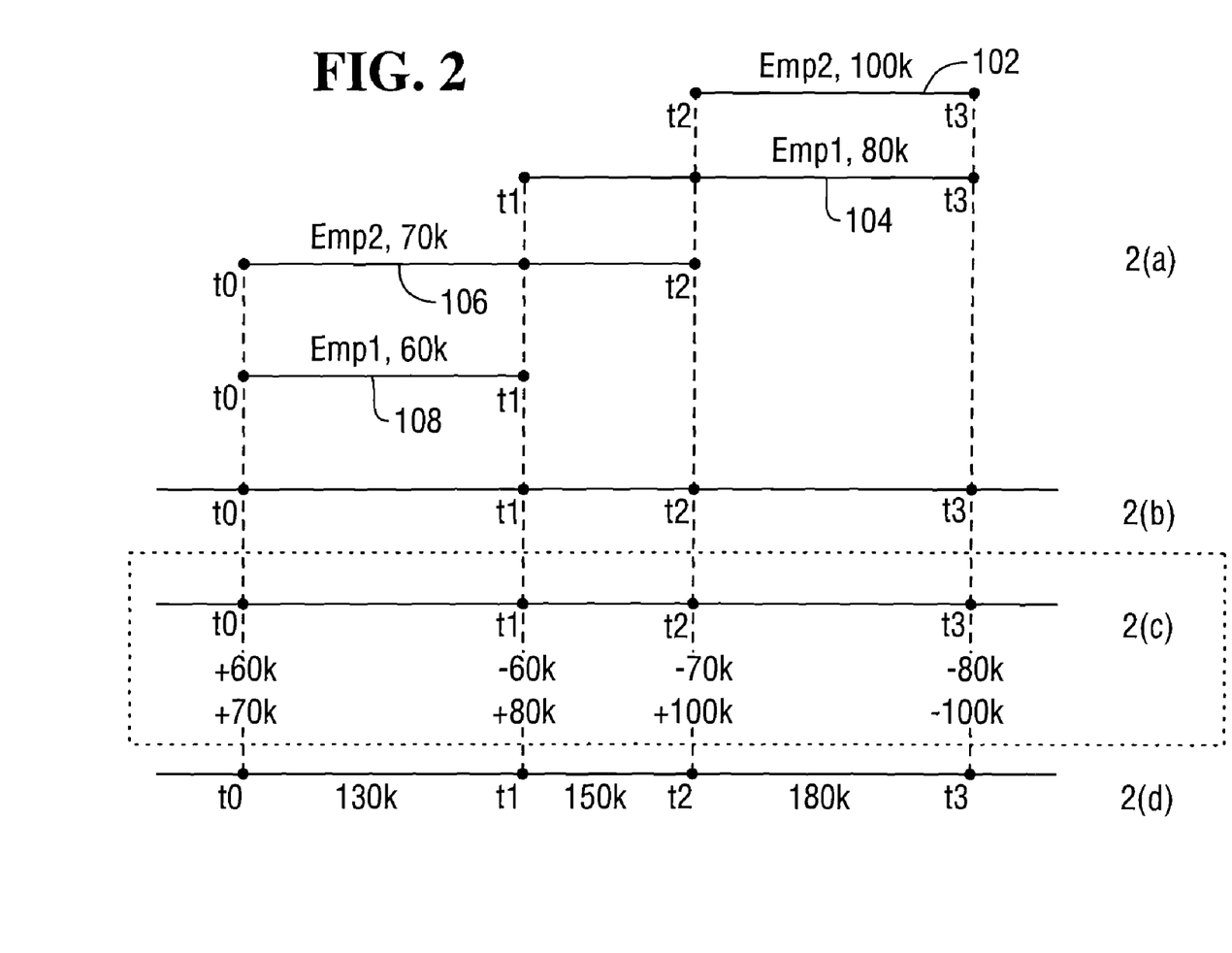
FIG. 2 is a graph that illustrates several example tuples and a technique of aggregating an attribute of the tuples, in accordance with an embodiment.

In FIG. 2(b), the algorithm for performing the temporal aggregation identifies the timestamps represented by the four tuples 102, 104, 106, 108. In this example, the identified timestamps include t0, t1, t2, and t3. Note that the identified timestamps are distinct timestamps.

For each of the identified timestamps, attribute value changes (or deltas) are determined, as depicted in FIG. 2(c). For example, at timestamp t0, the value change of the SALARY attribute for employee 1 is +60K, and the value change for the SALARY attribute for employee 2 is +70K. The +60K value change for employee 1 at timestamp t0 is based on tuple 108, and the +70K value change for employee 2 at timestamp t0 is based on tuple 106.

In general, at any given timestamp, if the timestamp corresponds to the starting timestamp (TSTART) of a tuple, then the attribute value (in this case the SALARY attribute value) of the tuple is indicated as a positive change. On the other hand, if the timestamp corresponds to the ending timestamp (TEND) of a tuple, then the attribute value of the tuple is indicated as a negative change. Timestamp t0 corresponds to the starting timestamp for both tuples 106 and 108, so that the SALARY values of tuples 106 and 108 are both positive additions (change values) at timestamp t0.

On the other hand, timestamp t1 is the ending timestamp for tuple 108, but is the starting timestamp for tuple 104. As a result, at timestamp t1, the SALARY attribute value of tuple 108 is indicated as a negative change (−60K), but the SALARY value of tuple 104 is indicated as a positive change (+80K).

Timestamp t2 is the ending timestamp for tuple 106, and the starting timestamp for tuple 102. As a result, at timestamp t2, the SALARY value of tuple 106 is indicated as a negative change (−70K), but the SALARY value of tuple 102 is indicated as a positive change (+100K).

Timestamp t3 is the ending timestamp for both tuples 102 and 104, such that the SALARY values of both tuples 102 and 104 are subtracted (−80K, −100K) at timestamp t3.

Once the values changes are determined at the timestamps according to the algorithm above, as depicted in FIG. 2(c), the total salary is equal to the sum of value changes at the different timestamps prior to timestamp t3 (which is the overall ending timestamp). Thus, the total salary is equal to (+60K+70K)+(−60K+80K)+(−70K+100K)=(180K). The sums are illustrated in FIG. 2(d). Thus, after the sum of value changes at timestamp t0, the output is 130K. Adding the value changes at timestamp t1, the total salary becomes 150K. After adding the value changes at timestamp t2, the total salary becomes 180K. The total salary 180K is the output for the temporal aggregate query (which sought the total salary for the period between t0 and t3). At timestamp t3, the total salary sum gets back down to zero in the above example.

The algorithm described above is linear-time. Each input row is only scanned once to get the total sum at each timestamp as well as the final moving sum. The algorithm is more effective when it is run in parallel.

As described above in FIG. 1 the database system 14 includes a plurality of access module processors (AMPS) 24. Each of these processors is capable of performing operations independently of each other and in parallel.

The parallel algorithm described below defines a plurality of consecutive temporal partitions. The temporal partitions are then allocated to respective processors. In one form a single temporal partition is allocated to a single processor. In other forms one or more temporal partitions is/are allocated to individual processors. In still further embodiments respective single temporal partitions are each allocated to one or more processors.

The set of consecutive temporal partitions is formally defined as:

$$P_1(P_1\_start, P_1\_end), P_2(P_2\_start, P_2\_end), \ldots, P_n(P_n\_start, P_n\_end), \text{ where}$$

$$P_i\_end = P_{i+1}\_start$$

One consideration on how to define the consecutive temporal partitions is to define partitions such that the number of rows generated by subsequent query execution are as close to equal as possible across each partition. As a result of this consideration, the duration or size of a certain partition might be much longer or shorter than other partitions. The most important consideration is that each partition has approximately the same number of rows to aggregate.

Value changes are aggregated within each partition using the respective processors to which each partition is allocated. The result is an aggregate value for the query.

Figure 3:
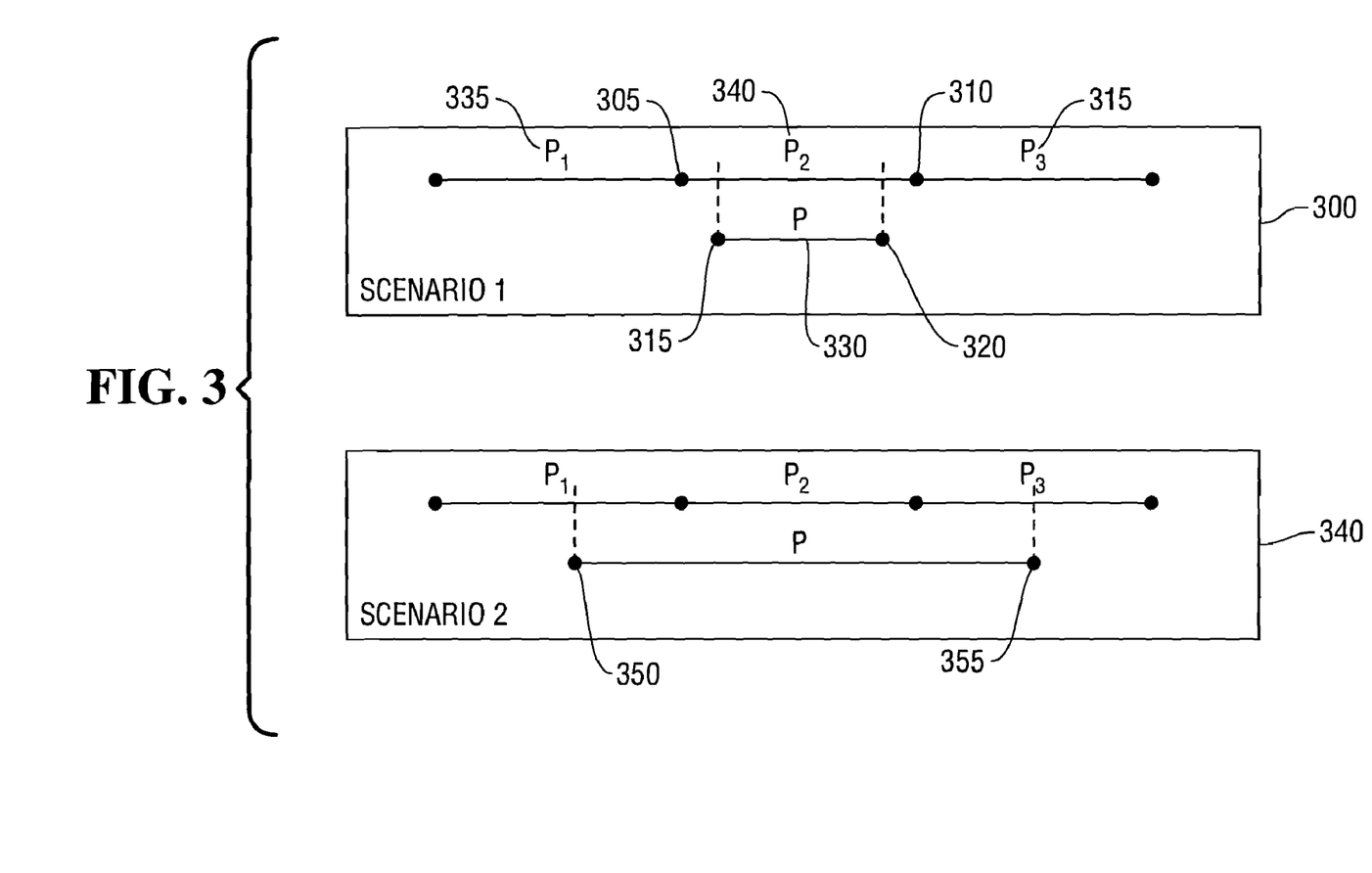
FIG. 3 shows the use of partitions to perform aggregation.

FIG. 3 illustrates how the partitions are used to conduct the aggregation. Three partitions $P_i$ are defined, where i=1, 2, 3.

FIG. 3 shows two scenarios. Both scenarios include partitions $P_1$, $P_2$ and $P_3$. Each of the partitions $P_i$ is defined by a starting timestamp and an ending timestamp. In the first case shown in FIG. 3 if an individual partition $P_i$ contains an input temporal data (v,p) then the input temporal data (v,p) is sent to partition $P_i$.

In the first example shown at 300 in FIG. 3 partition $P_2$ is defined by $P_2\_start$ shown at 305 and $P_2\_end$ shown at 310.

The input temporal data (v,p) is defined by the timestamps P_start shown at 315 and P_end shown at 320.

Input temporal data (v,p) 330 is entirely contained within partition $P_2$. A formal definition is that $P_2\_start<=P\_start<P\_end<=P_2\_end$.

This can be formally stated as follows:

If $P_i$ contains p (ie if $P_i\_start<=P\_start<P\_end<=P_i\_end$) then (v,p) is sent into partition $P_i$.

The second scenario shown at 340 in FIG. 3 indicates a situation where an input temporal data (v,p) is not contained within a single partition but instead is spread over more than one single partition.

The three partitions $P_1$, $P_2$ and $P_3$ are formally described as partitions $P_i$ where i=1, 2, 3. Once again, each of the partitions $P_i$ is defined by a starting timestamp and an ending timestamp.

There is an input temporal data (v,p). The value p within the input temporal data is defined by timestamps P_start and P_end. Timestamps P_start and P_end are shown at 350 and 355 respectively.

As shown in FIG. 3, the input temporal data (v,p) involves each of partitions $P_1$, $P_2$ and $P_3$. Input temporal data (v,p) has one portion that lies within partition $P_1$, has another portion that lies within partition $P_2$ and has a third portion that lies within partition $P_3$. Those portions of input temporal data (v,p) that lie within partitions $P_1$, $P_2$ and $P_3$ respectively are handled by the processors associated with each of partitions $P_1$, $P_2$ and $P_3$.

The formal statement of the above algorithm is:

---

If $P_i\_start <= P\_start < P_i\_end = P_{i+1}\_start < P_{i+1}\_end < ... = P_j\_start < P\_end <= P_j\_end$
then
(v, ($P\_start, P_i\_end$)) is sent into partition $P_i$,
(v, ($P_{i+1}\_start, P_{i+1}\_end$)) is sent into partition $P_{i+1}$,
...
(v, ($P_j\_start, P\_end$)) is sent into partition $P_j$.

---

Once the affected partitions have been identified, the aggregate algorithm is then run on each partition. The result from each partition is then aggregated to produce an aggregate value for the query. It is envisaged that the aggregate value V is able to be output in two consecutive periods. A further temporal normalization is run in this case to coalesce the consecutive periods.

An example of a temporal aggregate query is described below. The query is described with reference to the example base table EMPLOYEE_HISTORY described above and reproduced below:

| EMPNO | SALARY | TITLE | TSTART | TEND |
|---|---|---|---|---|
| 1001 | $ 60,000 | Software engineer | Jan. 01, 2007 | Dec. 31, 2007 |
| 1002 | $ 62,500 | Software engineer | Jan. 01, 2007 | Feb. 28, 2008 |
| 0801 | $ 80,000 | Sr. Software engineer | Jan. 01, 2007 | Mar. 31, 2008 |
| 0501 | $100,000 | Manager | Jan. 01, 2007 | Apr. 30, 2008 |
| 1001 | $ 62,500 | Software engineer | Jan. 01, 2008 | Now |
| 1002 | $ 72,500 | Software engineer | Mar. 01, 2008 | Now |
| 0801 | $ 90,000 | Sr. Software engineer | Apr. 01, 2008 | Now |
| 0501 | $110,000 | Manager | May 01, 2008 | Now |

The following is one example temporal aggregate SQL query statement to perform temporal aggregation on the salary attribute values of the rows above.

---

/*The following is one SQL statement*/
/*for each input tuple, (empno, salary, tstart, tend), generate 2 rows, (tstart, salary), end (tend, -salary)*/
WITH T1 (ts, DeltaSalary) AS (
SELECT TSTART, SALARY FROM EMPLOYEE_HISTORY
UNION ALL
SELECT TEND, 0-SALARY FROM EMPLOYEE_HISTORY),
/*on each timestamp, get the total delta salary*/
WITH T2 (ts, Salary) AS (
SELECT ts, sum(DeltaSalary) FROM T1 GROUP BY ts
)
/*final output, calculate the csum delta salary on the cumulative window*/
SELECT sum(Salary) over (order by ts rows between unbounded preceding and 1 preceding) as TotalSalary,
sum(ts) over (order by ts rows between 1 preceding and 1 preceding) as tstart, ts as tend
FROM T2

---

Figure 4:
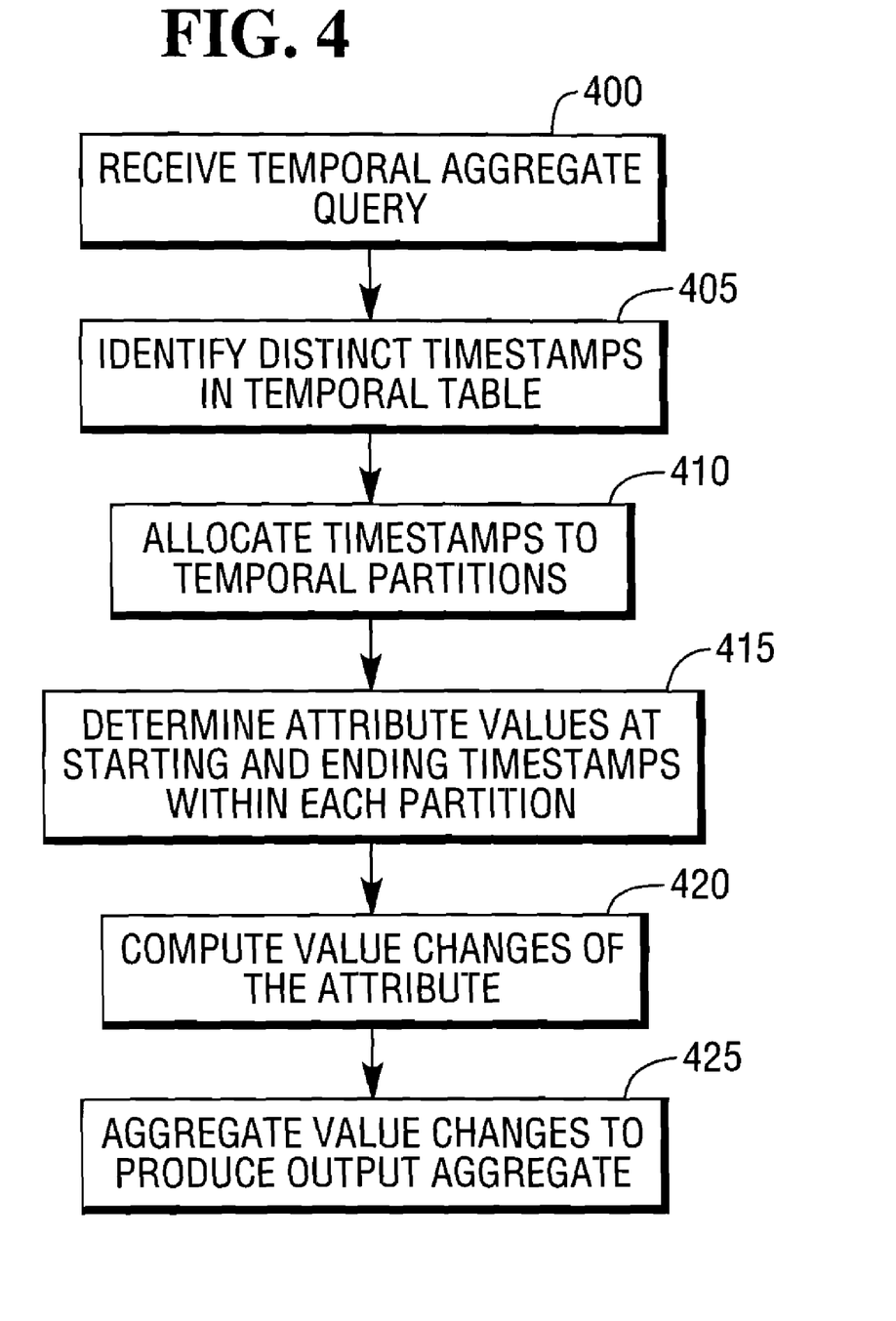
FIG. 4 illustrates a method of processing a temporal aggregate query, in accordance with an embodiment.

FIG. 4 shows a process according to an embodiment. A temporal aggregate query is received (at 400) by the database software. In response, the database software identifies (at 405) distinct timestamps in the temporal table. The timestamps are allocated to temporal partitions at 410. Attribute values at starting and ending timestamps are determined within each partition (at 415). Next, value changes at the identified timestamps are computed (at 420). Next, the values are aggregated (at 425) to produce the output aggregate for the temporal aggregate query.

Instructions of the various software routines or modules discussed herein (such as the database software) are loaded for execution on corresponding processors (such as CPUs 34 in FIG. 1). The processors include microprocessors, microcontrollers, processor modules or subsystems (including one or more microprocessors or microcontrollers), or other control or computing devices. As used here, a "processor" can refer to a single component or to plural components.

Data and instructions (of the various software modules and layers) are stored in one or more storage devices, which can be implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method executed by a plurality of processors in a database system, the database system having a temporal table, the method comprising:

defining a plurality of consecutive temporal partitions;

allocating the temporal partitions to the respective processors;

receiving a query to aggregate at least one attribute of the temporal table, wherein the at least one attribute is defined by a plurality of attribute values associated with a plurality of timestamps, and wherein each attribute value is stored in a respective tuple of a column of the temporal table;

in response to the query, identifying the plurality of timestamps in the temporal table, wherein each timestamp is a respective starting timestamp or a respective ending timestamp for each attribute;

allocating each timestamp to a respective one of the temporal partitions, such that each temporal partition has a similar number of tuples of the temporal table to aggregate;

for each of the identified timestamps, computing attribute value changes attribute values having a respective starting timestamp or a respective ending timestamp at the identified timestamp, wherein the computing is performed within each partition using the respective processors to which each partition is allocated, and wherein the attribute value changes are maintained separately during computation of the attribute value changes; and aggregating, subsequent to the computing, the attribute value changes within each partition using the respective processors to which each partition is allocated to produce an aggregate value for the query.

2. The method of claim 1, wherein receiving the query comprises receiving a Structured Query Language (SQL) query.

3. The method of claim 1, wherein receiving the query comprises receiving a Structured Query Language (SQL) on-line analytic processing (OLAP) query.

4. The method of claim 1, wherein the temporal table includes plural tuples, wherein each tuple contains timestamp information, and wherein identifying the plural timestamps is based on the timestamp information in the tuples.

5. The method of claim 4, wherein the timestamp information in each tuple comprises the respective starting timestamp and the respective ending timestamp for the attribute value of the respective tuple.

6. The method of claim 5, wherein identifying the plural timestamps comprises identifying distinct timestamps based on the starting timestamp and ending timestamp of each tuple.

7. The method of claim 6, wherein computing attribute value changes comprises, at each distinct timestamp, subtracting each attribute value of the at least one attribute of each tuple that has a respective ending timestamp at the distinct timestamp and adding each attribute value of the at least one attribute of each tuple that has a respective starting timestamp at the distinct timestamp.

8. The method of claim 1, wherein aggregating the value changes to produce the aggregate value comprises summing the attribute value changes.

9. The method of claim 1, wherein receiving the query comprises receiving a single query, and wherein the identifying, allocating, computing, and aggregating are performed in response to the single query.

10. An article comprising at least one non-transitory computer-readable storage medium containing instructions that when executed cause at least one processor in a database system to:

define a plurality of consecutive temporal partitions;
allocate the temporal partitions to the respective processors;
receive a query to aggregate at least one attribute value of the temporal table, wherein the at least one attribute is defined by a plurality of attribute values associated with a plurality of timestamps, and wherein each attribute value is stored in a respective tuple of a column of the temporal table;
in response to the query, identify the plurality of timestamps in the temporal table, wherein each timestamp is a respective starting timestamp or a respective ending timestamp for each attribute;

allocate each timestamp to a respective one of the temporal partitions, such that each temporal partition has a similar number of tuples of the temporal table to aggregate;

for each of the identified timestamps, compute attribute value changes in attribute values having a respective starting timestamp or a respective ending timestamp at the identified timestamp, wherein the computation is performed within each partition using the respective processors to which each partition is allocated, and wherein the attribute value changes are maintained separately during computation of the attribute value changes; and aggregate, subsequent to the computation, the attribute value changes within each partition using the respective processors to which each partition is allocated to produce an aggregate value for the query.

11. The article of claim 10, wherein the temporal table includes plural tuples, wherein each tuple contains timestamp information, and wherein identification of the plurality of timestamps is based on the timestamp information in the tuples.

12. The article of claim 11, wherein the timestamp information in each tuple comprises the starting timestamp and the ending timestamp for each attribute value, and wherein computation of the attribute value changes in the at least one attribute at the identified timestamps comprises:

at each of the identified timestamps, determining whether the identified timestamp corresponds to a starting timestamp or an ending timestamp of a particular one of the tuples;
if the identified timestamp is the starting timestamp, providing a positive value change corresponding to the attribute value of the at least one attribute in the particular tuple; and
if the identified timestamp is the ending timestamp, providing a negative value change, corresponding to the attribute value of the at least one attribute in the particular tuple.

13. The article of claim 10, wherein the at least one computer-readable storage medium contains instructions that when executed, cause at least one processor in a database system to receive a single query, wherein the identification, allocation, computation, and aggregation are performed in response to the single query.

14. A database system comprising:

a storage subsystem to store a temporal base table having a plurality of tuples each containing timestamp information; and
at least one processor configured to:
define a plurality of consecutive temporal partitions;
allocate the temporal partitions to the respective processors;
receive a query to aggregate at least one attribute of the temporal table, wherein the at least one attribute is defined by a plurality of attribute values associated with a plurality of timestamps, and wherein each attribute value is stored in a respective tuple of a column of the temporal table;
in response to the query, identify the plurality of timestamps in the temporal table, wherein each timestamp is a respective starting timestamp or a respective ending timestamp for each attribute value;

allocate each timestamp to a respective one of the temporal partitions, such that each temporal partition has a similar number of tuples of the temporal table to aggregate;

for each of the identified timestamps, compute attribute value changes in attribute values having a respective starting timestamp or a respective ending timestamp at the identified timestamp, wherein the computation is performed within each partition using the respective processors to which each partition is allocated, and wherein the attribute value changes are maintained separately during computation of the attribute value changes; and aggregate, subsequent to the computing, the attribute value changes within each partition using the respective processors to which each partition is allocated to produce an aggregate value for the query.

15. The database system of claim 14, wherein the processor is further configured to, at each identified timestamp, subtract each attribute value of the at least one attribute of each tuple that has a respective ending timestamp at the identified timestamp and add each attribute value of the at least one attribute of each tuple that has a respective starting timestamp at the identified timestamp.

16. The database system of claim 14, wherein the received query comprises a Structured Query Language (SQL) on-line analytic processing (OLAP) query.

* * * * *